(12) United States Patent
Miyato et al.

(10) Patent No.: US 7,505,398 B2
(45) Date of Patent: Mar. 17, 2009

(54) OFDM MODULATION/DEMODULATION SYSTEM

(75) Inventors: Yoshikazu Miyato, Chiba (JP); Yasunari Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/892,135

(22) Filed: Aug. 20, 2007

(65) Prior Publication Data

US 2007/0297322 A1 Dec. 27, 2007

Related U.S. Application Data

(63) Continuation of application No. 10/129,203, filed as application No. PCT/JP01/07799 on Sep. 7, 2001, now Pat. No. 7,327,669.

(30) Foreign Application Priority Data

Sep. 7, 2000 (JP) ............ P2000-272238

(51) Int. Cl.
- H04B 7/216 (2006.01)
- H04J 11/00 (2006.01)
- H04L 27/00 (2006.01)
- H04L 27/06 (2006.01)

(52) U.S. Cl. ............ 370/208; 370/335; 375/324; 375/340

(58) Field of Classification Search ............ 370/208, 370/204, 335, 212, 215, 209, 203; 375/146, 375/135, 136, 260, 261, 298; 398/81, 29
See application file for complete search history.

(56) References Cited

U.S. PATENT DOCUMENTS

| | | | |
|---|---|---|---|
| 4,811,394 A | 3/1989 | Ragavan et al. | |
| 5,757,766 A * | 5/1998 | Sugita | ............ 370/206 |
| 5,809,060 A * | 9/1998 | Cafarella et al. | ............ 375/146 |
| 6,414,986 B1 | 7/2002 | Usui | |
| 6,424,394 B1 | 7/2002 | Morii | |
| 6,606,296 B1 | 8/2003 | Kokkonen | |
| 6,724,829 B1 * | 4/2004 | Tzukerman et al. | ......... 375/295 |

(Continued)

FOREIGN PATENT DOCUMENTS

JP 03-196731 8/1991

(Continued)

OTHER PUBLICATIONS

"Digital Video Broadcasting (DVB); Framing Structure, Channel Coding and Modulation for Digital Terrestrial Television," ETSI EN 300 744, vol. 1.2.1, Jul. 1999, pp. 8-34, XP002231749.

(Continued)

*Primary Examiner*—Hanh Nguyen
(74) *Attorney, Agent, or Firm*—Finnegan, Henderson, Farabow, Garrett & Dunner, L.L.P.

(57) ABSTRACT

A radio relay system (1) comprises a wireless camera (11) and a signal receiving relay station (12). The wireless camera (11) wirelessly transmits signals to the signal receiving relay station (12) by using the OFDM modulation method. The wireless camera (11) and the signal receiving relay station (12) perform energy dispersion at the time of transmission-line-coding/decoding a transport stream. The PRBS seed (initial value) to be used for the energy dispersion can be externally modified and the user can arbitrarily select a value for the seed.

1 Claim, 8 Drawing Sheets

U.S. PATENT DOCUMENTS 6,882,680 B1 * 4/2005 Oleynik ..................... 375/147
6,973,118 B1 12/2005 Ikeda et al.
7,327,669 B2 * 2/2008 Miyato et al. ............... 370/208

FOREIGN PATENT DOCUMENTS

| JP | 08-251117 | 9/1996 |
| JP | 08-331095 | 12/1996 |
| JP | 10-224340 | 8/1998 |

OTHER PUBLICATIONS

Kaiser et al., "Optimal Detection when Combining DM-CDMA with Convolutional and Turbo Channel Coding," 1996 IEEE International Conference on Communications (ICC), Converging Technologies for Tomorrow's Applications, Dallas, Jun. 23-27, 1996, IEEE International Conference on Communications (ICC), New York, IEEE, US, vol. 1, Jun. 23, 1996, pp. 343-348, XP000625694.

* cited by examiner

OFDM MODULATION/DEMODULATION SYSTEM

This is a continuation of application Ser. No. 10/129,203, filed on Aug. 27, 2002, now U.S. Pat. No. 7,327,669 which is incorporated herein by reference. application Ser. No. 10/129,203 is the U.S. National Stage of International Application No. PCT/JP01/07799, filed on Sep. 7, 2001 and claims priority to Japanese Application No. 2000-272238, filed on Sep. 7, 2000.

TECHNICAL FIELD

This invention relates to an OFDM modulator, an OFDM demodulator and an OFDM transmission/reception system that can find applications in digital broadcasting such as broadcasting relay facilities using orthogonal frequency division multiplexing (OFDM) modulation system.

BACKGROUND ART

In recent years, many proposals have been made for orthogonal frequency division multiplexing (OFDM) which is a modulation technique for transmitting digital signals. With OFDM modulation, a large number of orthogonal subcarriers are provided in a transmission band and data are allocated to the amplitude and the phase of each subcarrier for digital modulation using PSK (Phase Shift Keying) or QAM (Quadrature Amplitude Modulation). With OFDM modulation, since a transmission band is divided by a large number of subcarriers, the bandwidth of each subcarrier is rather small to make the modulation rate low, although the overall transmission rate is comparable to that of any known modulation method. Additionally, with OFDM modulation, the symbol transmission rate is low because a large number of subcarriers are transmitted in parallel. Because of these characteristics, it is possible with OFDM modulation to reduce the relative multipath time length relative to the symbol time length to make the transmission less vulnerable to multipath interference. Still additionally, with OFDM modulation, since data are allocated to a plurality of subcarriers, the transmission/reception circuit can be formed by using an inverse fast Fourier transform (IFFT) operation circuit for modulation and a fast Fourier transform (FFT) operation circuit for demodulation.

In view of the above identified characteristics of OFDM modulation, efforts are being paid to apply it to ground wave digital broadcasting and communication that are apt to be strongly affected by multipath interference.

More specifically, standards for terrestrial digital broadcasting employing OFDM modulation have been proposed, including the DVB-T (Digital Video Broadcasting-Terrestrial) Standard and the ISDB-T (Integrated Services Digital Broadcasting-Terrestrial) Standard.

With OFDM modulation, signals are transmitted on the basis of a unit of symbol referred to as OFDM symbol as shown in FIG. 1 of the accompanying drawings. For signal transmission, an OFDM symbol is made to comprise an effective symbol covering a signal period good for IFFT and a guard interval formed by copying a rear part of the effective symbol. The guard interval is arranged at the head of the OFDM symbol. According to the DVB-T Standard (2K mode), for instance, the effective. symbol contains 2,048 subcarriers arranged with regular intervals of 4.14 kHz. Data are modulated on 1,705 subcarriers out of the 2,048 subcarriers in an effective symbol. The guard interval has a time length equal to ¼ of that of the effective symbol.

Firstly, a known OFDM modulator will be described below.

Referring to FIG. 2 of the accompanying drawings, the known OFDM modulator 101 comprises a MUX adaptation/energy dispersion circuit 102, a Reed-Solomon encoder 103, a convolutional interleave circuit 104, a convolutional encoder 105, a bit/symbol interleave circuit 106, a mapping circuit 107, a frame adaptation circuit 108, an IFFT circuit 109, a guard interval adding circuit 110, a D/A converter 111, a frond end 112, an antenna 113 and a TPS generation circuit 114.

The OFDM modulator 101 receives as input an MPEG-2 transport stream formed by compressing and multiplexing video and audio signals by means of an upstream MPEG encoder. The transport stream is supplied to the MUX adaptation/energy dispersion circuit 102 of the OFDM modulator 101.

The MUX adaptation/energy dispersion circuit 102 bit-inverts the sync byte 47 h that is the leading byte of TS packet once in every eight TS packets to turn it to B8h. At this time, it initializes the shift register for generating a pseudo-random number series (PRBS) that is used for energy dispersion once in every eight TS packets by using a seed. According to the DVB-T Standard, the PRBS is $(x^{15}+x^{14}+1)$ and the seed is 009 Ah. The MUX adaptation/energy dispersion circuit 102 operates for energy dispersion by performing an exclusive OR operation of the data excluding the sync byte (1 byte) of the TS packet and the PRBS. The data series that has been subjected to energy dispersion is supplied to the Reed-Solomon encoder 103.

The Reed-Solomon encoder 103 performs a Reed-Solomon coding operation on the input data series and adds a parity of 16 bytes for each TS packet. The data series to which a parity is added is supplied to the convolutional interleave circuit 104.

The convolutional interleave circuit 104 performs an interleaving operation on the input data series. For example, the convolutional interleave circuit 104 has 12 branches that are provided with respective delay elements having respective amounts of delay that are different from each other as shown in FIG. 3. It selects a same branch for both input and output, switching branches for every byte sequentially in a manner such as 0, 1, 2, 3, 4, . . . , 10, 11, 0, 1, 2, . . . . It outputs a byte for input a byte and performs a convolutional interleaving operation. The data series subjected to the convolutional interleaving operation is then fed to the convolutional encoder 105.

The convolutional encoder 105 performs convolutional coding by means of two encoders such as G1=171 (Octal) and G2=133 (Octal) and outputs encoded 2 bits for a 1-bit input. When it performs a puncturing operation, it does so on the output of encoded 2 bits. The data series subjected to convolutional coding is then fed to the bit/symbol interleave circuit 106.

The bit/symbol interleave circuit 106 interleaves the frequency in the OFDM symbol and the bits allocated to mapping points. The interleaved data series is then supplied to the mapping circuit 107.

The mapping circuit 107 divides the data series by a code length conforming to the employed modulation method (e. g., a code length of 6 bits for 64 QAM) and allocates the divided data series to predetermined mapping points. As a result of allocating the data series to the mapping points, two-dimensional information comprising I and Q components is output. The data series that is turned to two-dimensional information is supplied to the frame adaptation circuit 108.

The frame adaptation circuit 108 performs a so-called OFDM framing operation of inserting a predetermined pilot signal, a transmission line multiplexing control signal (IPS: Transmission Parameter Signaling) and a null signal fed from the TPS generation circuit 114 into the mapped two-dimensional information. The data series subjected to OFDM framing is then fed to the IFFT circuit 109.

The IFFT circuit 109 turns the 2,048 sets of data for I and Q to an OFDM symbol and performs an IFFT operation collectively on it. The data series subjected to an IFFT operation is then supplied to the guard interval adding circuit 110 on an effective symbol by-effective symbol basis.

The guard interval adding circuit 110 makes a copy of the signal waveform of the rear ¼ of the signal of each effective symbol output from the IFFT circuit 109 and adds the copy to the head of the effective symbol to make it a guard interval. The data series now added with a guard interval is then supplied to the D/A converter 111.

The D/A converter 111 converts the digital signal into an analog signal and supplies the latter to the front end 112.

The front end 112 up-converts the frequency of the analog signal obtained by the D/A conversion to the RF band and transmits it into air by way of the antenna 113.

Now, a known OFDM demodulator will be described below by referring to FIG. 4 of the accompanying drawings.

As shown in FIG. 4, the known OFDM demodulator 131 comprises an antenna 132, a tuner 133, an A/D converter 134, a digital orthogonal demodulation circuit 135, an FFT operation circuit 136, a narrow band fc error computation (FAFC) circuit 137, a broad band fc error computation circuit 138, a numerical-controlled oscillation (NCO) circuit 139, an equalizer 140, a demapping circuit 141, a TPS (Transmission Parameter Signaling) demodulation circuit 142, a bit/symbol deinterleave circuit 143, a Viterbi decoding circuit 144, a convolutional deinterleave circuit 145, a Reed-Solomon decoding circuit 146 and a MUX adaptation/energy inverse dispersion circuit 147.

The wave transmitted from the broadcasting station for digital television broadcasting is received by the antenna 132 of the OFDM decoder 131 and fed to the tuner 133 as RF signal.

The tuner 133 transforms the frequency of the RF signal received by the antenna 132 and outputs an IF signal. The output IF signal is then fed to the A/D converter 134.

The A/D converter 134 digitizes the IF signal. The digitized IF signal is then supplied to the digital orthogonal modulation circuit 135. According to the DVB-T Standard (2K mode), the A/D converter 134 quantizes the effective symbol and the guard interval of a so-called OFDM time region signal with a double clock typically for sampling respectively 4,096 samples and 1,024 samples.

The digital orthogonal demodulation circuit 135 performs orthogonal demodulation on the digitized IF signal, using the carrier signal of a predetermined frequency (carrier frequency) and outputs a base band OFDM signal. The base band OFDM signal output from the digital orthogonal demodulation circuit 135 is a so-called time region signal that is to be subjected to an FFT operation. Therefore, a base band signal that has been subjected to digital orthogonal demodulation and yet is to be subjected to an FFT operation is referred to as OFDM time region signal hereinafter. As a result of orthogonal demodulation, the OFDM time region signal becomes a complex signal containing a real axis component (I channel signal) and an imaginary axis component (Q channel signal).

The OFDM time region signal output from the digital orthogonal demodulation circuit 135 is then supplied to the FFT operation circuit 136 and the narrow band fc error computation circuit 137.

The FFT operation circuit 136 performs an FFT operation on the OFDM time region signal and extracts the orthogonal-modulated data on each subcarrier, which data is then output. The signal output from the FFT operation circuit 136 is a so-called frequency region signal that has been subjected to FFT. Therefore, a signal that has been subjected to an FFT operation is referred to as OFDM frequency region signal hereinafter.

The FFT operation circuit 136 extracts the signals in an effective symbol length (e. g., 2,048 samples) out of an OFDM symbol. In other words, it extracts signals from the part of an OFDM symbol obtained by excluding the guard interval. Then, it performs an FFT operation on the OFDM time region signal of the extracted 2,048 samples. More specifically, the operation starting position will be found between the boundary of the OFDM symbol (position at A in FIG. 1) and the end position of the guard interval (position at B in FIG. 1). This range of operation is referred to as FFT window.

Like the OFDM time region signal, the OFDM frequency region signal output from the FFT operation circuit 136 is a complex signal containing a real axis component (I channel signal) and an imaginary axis component (Q channel signal). The OFDM frequency region signal is then supplied to the broad band fc error computation circuit 138 and the equalizer 140.

The narrow band fc error computation circuit 137 computes the carrier frequency error contained in the OFDM time region signal. More specifically, the narrow band fc error computation circuit 137 computes the narrow band carrier frequency error with an accuracy of ±½ of the subcarrier frequency interval (4.14 kHz) or less. The carrier frequency error is the error of the central frequency position of the OFDM time region signal that can be produced typically by displacement of the reference frequency output from the local oscillator of the tuner 133. The error rate of the output data increases when this error becomes large. The narrow band carrier frequency error determined by the narrow band fc error computation circuit 137 is then fed to the NCO 139.

The broad band fc error computation circuit 138 computes the carrier frequency error contained in the OFDM time region signal. More specifically, the broad band fc error computation circuit 138 computes the broad band carrier frequency error with an accuracy of the subcarrier frequency interval (4.14 kHz) or less. The broad band fc error computation circuit 138 refers to a continual pilot signal (CP signal) and computationally determines the extent, or the amount of shift, by which the CP signal is shifted from the proper insertion position of the CP signal. The broad band carrier. frequency error determined by the broad band fc error computation circuit 138 is supplied to the NCO 139.

The NCO 139 adds the narrow band carrier frequency error of the accuracy of ±½ of the subcarrier frequency interval as determined by the narrow band fc error computation circuit 137 and the broad band carrier frequency error of the accuracy of the subcarrier frequency interval as determined by the broad band fc error computation circuit 138 and outputs a carrier frequency error correction signal whose frequency increases/decreases as a function of the carrier frequency error obtained as a result of the addition. The carrier frequency error correction signal is a complex signal and supplied to the digital orthogonal demodulation circuit 135. The digital orthogonal demodulation circuit 135 performs digital orthogonal demodulation, correcting the carrier frequency fc according to the carrier frequency error correction signal.

The equalizer 140 equalizes the phase and the amplitude of the OFDM frequency region signal, using a scattered pilot signal (SP signal). The OFDM frequency region signal whose phase and amplitude are equalized is then supplied to the demapping circuit 141 and the TPS demodulation circuit 142.

The TPS demodulation circuit 142 separates the TPS signal assigned to a predetermined frequency component and demodulates the information containing the coding ratio, the modulation method, the guard interval length and so on from the signal.

The demapping circuit 141 performs a demapping operation on the OFDM frequency region signal whose phase and amplitude have been equalized by the equalizer 140 according to the modulation method to decode the data. The demapped data is then fed to the bit/symbol deinterleave circuit 143.

The bit/symbol deinterleave circuit 143 performs an operation exactly opposite to that of bit-interleaving and symbol-interleaving conducted by the modulator. The data that is subjected to bit-deinterleaving and symbol-deinterleaving is then supplied to the Viterbi decoding circuit 144.

The Viterbi decoding circuit 144 performs a maximum likelihood decoding operation, using the Viterbi algorithm. The data subjected to maximum likelihood decoding is then supplied to the convolutional deinterleave circuit 145.

The convolutional deinterleave circuit 145 operates oppositely relative to the convolutional interleave circuit of the modulator. The data subjected to convolutional deinterleaving is then fed to the Reed-Solomon decoding circuit 146.

The Reed-Solomon decoding circuit 146 decodes the Reed-Solomon code according to the parity of the 16 bytes added by the modulator and corrects errors, if any. The data subjected to Reed-Solomon decoding is then fed to the MUX adaptation/energy inverse dispersion circuit 147.

If the sync byte of the TS packet that is the leading byte is 47 h, the MUX adaptation/energy inverse dispersion circuit 147 does nothing on it. However, if the sync byte is B8h, it inverts the bits and modifies the byte to 47 h. At this time, the MUX adaptation/energy inverse dispersion circuit 147 initializes the shift register for generating a pseudo-random number series (PRBS) that is used for energy dispersion at every TS packet whose sync byte is B8h by means of a predetermined seed. According to the DVB-T Standard, the PRBS is $(x^{15}+x^{14}+1)$ and the seed is 009 Ah. The MUX adaptation/energy inverse dispersion circuit 147 operates for energy inverse dispersion by performing an exclusive OR operation of the data excluding the sync byte (1 byte) of the TS packet and the PRBS. The data series that has been subjected to energy inverse dispersion is supplied typically to a downstream MPEG-2 decoder as transport stream.

Meanwhile, wireless cameras are being used for live new reports, live sports coverages and live coverages of various events of television broadcasting. Wireless television cameras provide advantages over cabled television cameras including non-need of cabling and de-cabling operations and freedom of selection of camera angles and shooting positions to improve the mobility of cameras on site because signals of the images and the sounds taken up by the cameras are transmitted wirelessly by means of ground waves to the base station that may be an outside broadcast van.

Additionally, the video signals and audio signals obtained by the shooting operation of the wireless camera are digitized and transmitted to the base station by using a digital modulation method.

However, a plurality of broadcasting organizations may report independently from a site. If the signals are transmitted wirelessly in such a situation, they may be received not only by the staff of the reporting broadcasting organization but also by the third party that may be the staff of other broadcasting organizations. The signals may include those of the picked up raw images and sounds as well as those of auxiliary information.

DISCLOSURE OF THE INVENTION

In view of the above identified circumstances, it is therefore the object of the present invention to provide an OFDM modulator, an OFDM demodulator and an OFDM transmission/reception system that can prevent signals including those of picked up images and sounds and those of auxiliary information from being received by the third party in a simple way.

In an aspect of the present invention, there is provided an OFDM modulator for performing orthogonal frequency division multiplexing (OFDM) modulation on a digital data series comprising an energy dispersion means for dispersing energy for the digital data series by means of a pseudo-random number series, and an initial value selecting means for making the initial value of said pseudo-random number series variable.

With an OFDM modulator according to the invention, the initial value of the pseudo-random number series to be used for energy dispersion is varied typically according to the external input.

In another aspect of the present invention, there is provided an OFDM demodulator for demodulating the digital data series from an orthogonal frequency division mulitplexed (OFDM) signal comprising an energy inverse dispersion means for performing energy inverse dispersion for the demodulated digital data series by means of a pseudo-random number series, and an initial value selecting means for making the initial value of said pseudo-random number series variable according to the external input.

With an OFDM demodulator according to the invention, the initial value of the pseudo-random number series to be used for energy dispersion is varied typically according to the external input.

In still another aspect of the invention, there is provided an OFDM transmission/reception system for radio transmission of an orthogonal frequency division multiplexed (OFDM) signal comprising a transmitter having an energy dispersion means for dispersing energy for an digital data series by means of a pseudo-random number series, an initial value selection means for making the initial value of said pseudo-random number series variable, a modulation means for performing orthogonal frequency division multiplexing (OFDM) modulation for the energy inverse-dispersed digital data series and a transmission means for wirelessly transmitting the OFDM signal generated by the OFDM modulation, and a receiver having a reception means for receiving said OFDM signal wirelessly transmitted from said transmitter, a modulation/demodulation means for performing orthogonal frequency division multiplexing (OFDM) demodulation for the received OFDM signal, an energy inverse dispersion means for inversely dispersing energy for the demodulated digital data series by means of a pseudo-random number series and an initial value selection means for making the initial value of said pseudo-random number series variable, a same value being selected for the initial value of the pseudo-random number series of said transmitter and for the initial value of the pseudo-random number series of said receiver.

With an OFDM transmission/reception system according to the invention, the initial value of the pseudo-random number series to be used by the transmitter and the receiver for energy dispersion is made variable typically according to the external input.

BEST MODE FOR CARRYING OUT THE INVENTION

Now, the present invention will be described by referring to the accompanying drawings that illustrate a preferred embodiment of the invention, which is a terrestrial digital radio relay system (to be referred to as radio relay system hereinafter) that can suitably be used for shooting operations of cameras on the site of live coverage of a news report, sports or some other event.

Figure 5:
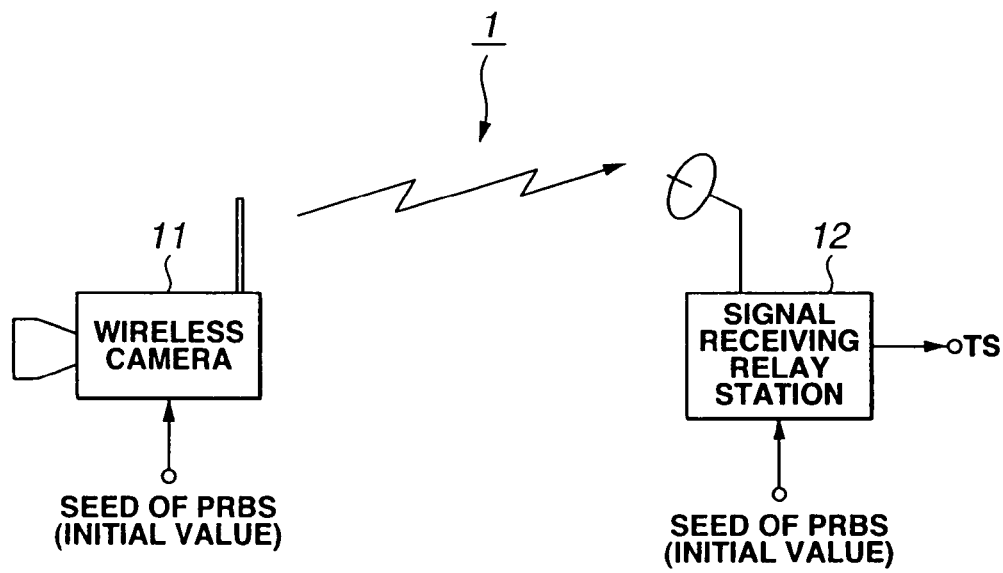
FIG. 5 is a schematic illustration of the configuration of a radio relay system realized by applying the present invention.

FIG. 5 is a schematic illustration of the configuration of the embodiment of radio relay system according to the invention.

Referring to FIG. 5, the radio relay system 1 comprises a wireless camera 11, a signal receiving radio relay station 12 for receiving the signals transmitted from the wireless camera 11.

The radio relay system 1 is typically used for shooting operations of the camera on the site of live coverage of a news report, sports or some other event. The video signal of raw image and sound picked up by the wireless camera 11 is transmitted to the signal receiving radio relay station 12 by ground wave radio transmission. It will be appreciated that the mobility of the camera of the radio relay system 1 is remarkably improved on the site of live coverage because the camera angle and the shooting position of the camera is not constrained by the cable connecting the camera and the relay station.

This radio relay system 1 uses transport streams as defined in the MPEG-2 Systems for radio transmission signals to be transmitted from the wireless camera 11 to the radio relay station 12 and adopts the OFDM (orthogonal frequency division multiplexing) modulation method. Thus, the radio relay system 1 can transmit high quality images and sounds with an excellent S/N ratio if compared with a system adapted to transmit analog raw images because it uses transport streams obtained by digitizing raw images. The OFDM modulation method is characterized in that it scarcely shows image quality degradation that can be caused by fluctuations in the electric field intensity due to moving signal reception and is hardly influenced by multipath interference. Therefore, it is possible to transmit high quality images and sounds by using the OFDM modulation method.

Additionally, with the radio relay system 1, it is possible to externally and arbitrarily select a pseudo-random number series (PRBS) seed (initial value) to be used for energy dispersion at the time of OFDM modulation of the wireless camera 11 and a pseudo-random number series (PRBS) seed (initial value) to be used for energy inverse dispersion at the time of OFDM demodulation of the signal receiving relay station 12. With the radio relay system 1, it is so arranged between the wireless camera 11 and the signal receiving relay station 12 that a same seed (initial value) is selected for both the wireless camera 11 and the signal receiving relay station 12.

Now, the configuration of the wireless camera 11 will be described by referring to FIG. 6.

Figure 6:
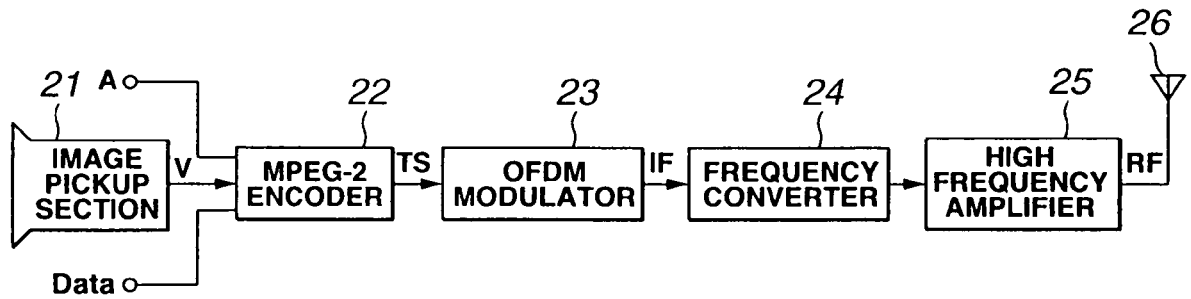
FIG. 6 is a schematic block diagram of a wireless camera that can be used for the radio relay system of FIG. 5.

As shown in FIG. 6, the wireless camera 11 comprises an image pickup section 21, an MPEG-2 encoder 22, an OFDM modulator 23, a frequency converter 24, a high frequency amplifier 25 and a transmission antenna 26.

The image pickup section 21 by turn comprises, among others, a CCD image sensor, an A/D converter and a camera signal processor. The image pickup section 21 is a module adapted to process the electric signal produced from the image picked up by the CCD image sensor for analog/digital conversion and transmission timing and convert it into a digital video signal. The digital video signal output from the image pickup section 21 is supplied to the MPEG-2 encoder 22.

The MPEG-2 encoder 22 receives the digital video signal (V signal in FIG. 6), the digital audio signal (A signal in FIG. 6) obtained by digitizing the sound signal. representing the sound caught by one or more than one microphones and a predetermined data signal (D signal in FIG. 6) as input and performs an operation of compression coding on these signals according to the MPEG-2 Systems. Then, the compressed data are multiplexed to generate a transport stream as defined in the MPEG-2 Systems. The transport stream is constituted by transport packets (TS packets), each having a fixed length of 188 bytes. Video signals, audio signals and data signals are described in the payload sections of the TS packets. The transport stream generated by the MPEG-2 encoder 22 is supplied to the OFDM modulator 23.

The OFDM modulator 23 performs predetermined transmission-line-coding operations including energy dispersion, RS encoding, convolutional interleaving, inner coding, bit interleaving, symbol interleaving, mapping conforming to the modulation method and OFDM framing such as insertion of a predetermined pilot signal and a null signal on the input transport stream. Additionally, the OFDM modulator 23 performs operations of OFDM modulation on the transmission-line-coded data stream including carrying out an orthogonal transform of an IFFT (Inverse Fast Fourier Transform) typically by using an IQ signal of 2,048 sets of data as a symbol for transforming it into a time region OFDM signal, adding a guard interval to the time region OFDM signal by copying a rear part of an effective symbol to a leading part of the symbol and carrying out orthogonal modulation on the time region OFDM signal, to which the guard interval is added, to generate an IF signal of an intermediate frequency band. The configuration of the OFDM modulator 23 will be described in greater detail hereinafter. The IF signal output from the OFDM modulator 23 is supplied to the frequency converter 24.

The frequency converter 24 transforms the IF signal into an RF signal that can be transmitted into air by up-converting the carrier wave frequency of the IF signal. The RF signal is then supplied to the high frequency amplifier 25.

The high frequency amplifier 25 performs high frequency amplification on the RF signal and transmits it into air from the transmission antenna 26.

The signal transmitted from the wireless camera 11 having the above described configuration is received by the signal receiving relay station 12.

Thus, the wireless camera 11 having the above described configuration encodes the picked up raw image into a transport stream and OFDM modulates the transport stream, which is transmitted to the signal receiving relay station 12 by way of a ground wave.

Figure 7:
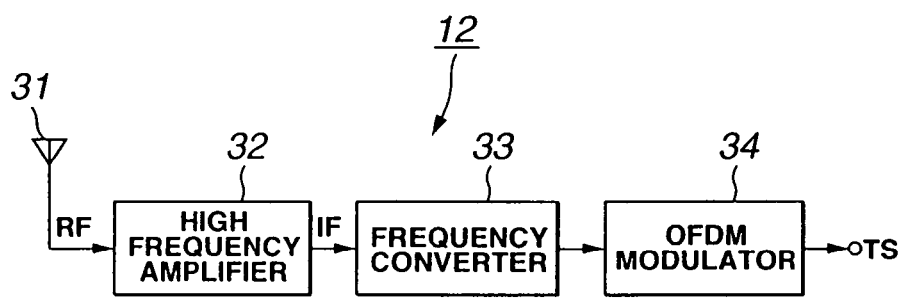
FIG. 7 is a schematic block diagram of the reception relay station of the radio relay system of FIG. 5.

Now, the signal receiving relay station 12 will be described by referring to FIG. 7.

The signal receiving relay station 12 comprises a transmission antenna 31, a high frequency amplifier 32, a frequency converter 33 and an OFDM demodulator 34.

The transmission antenna 31 receives the transmission wave of the RF signal transmitted from the wireless camera 11 and forwards it to the high frequency amplifier 32.

The high frequency amplifier 32 performs high frequency amplification on the RF signal received by the transmission antenna 31. The high-frequency-amplified RF signal is then supplied to the frequency converter 33.

The frequency converter 33 down-converts the high-frequency-amplified RF signal to an IF signal of a predetermined carrier wave frequency. The frequency-converted IF signal is then supplied to the OFDM demodulator 34 of receiving section 16 by way of IF cable 15.

The OFDM demodulator 34 performs processing operations on the input IF signal, including channel selection and orthogonal demodulation. Additionally, the OFDM demodulator 34 performs various sync operations such as FFT window sync and symbol timing sync, while performing processing operations of OFDM demodulation including orthogonal transform of transforming the signal into a frequency region OFDM signal, using an FFT (Fast Fourier Transform) for each effective symbol, waveform equalizing and mapping in order to demodulate the transmitted data. Furthermore, the OFDM demodulator 34 performs transmission-line-decoding operations on the transmitted and demodulated data including symbol deinterleaving, bit deinterleaving, inner code decoding, convolutional deinterleaving, RS decoding and energy inverse dispersion in order to demodulate the transmitted data. In this way, the transport stream transmitted from the wireless camera 11 is output as a result of the OFDM demodulation/transmission-line decoding. The configuration of the OFDM demodulator 34 will be described in greater detail hereinafter.

The transport stream output from the OFDM demodulator 34 is then transmitted to the broadcasting station by means of a transmission-line-modulator and a transmitter (not shown). Then, the transmitted data is processed further in the broadcasting station before it is broadcast to the viewers.

In this way, the signal receiving relay station 12 having the above described configuration receives the signal transmitted from the wireless camera 11 by terrestrial radio transmission and outputs the corresponding transport stream.

Now, the OFDM modulator 23 of the wireless camera 11 will be described in greater detail by referring to FIG. 8.

Figure 8:
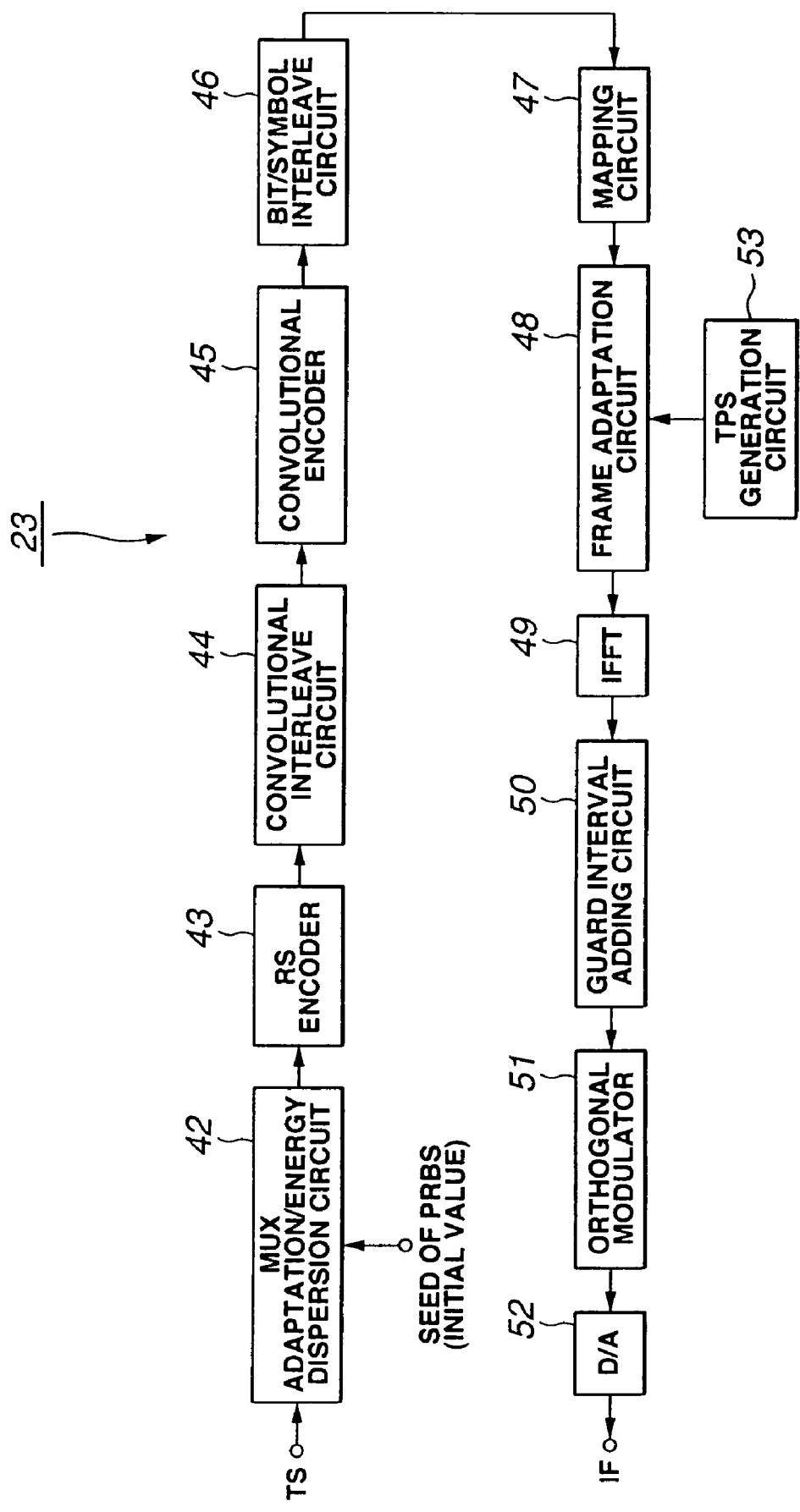
FIG. 8 is a schematic block diagram of the OFDM modulator of the wireless camera of FIG. 6.

As shown in FIG. 8, the OFDM modulator 23 comprises a MUX adaptation/energy dispersion circuit 42, a Reed-Solomon encoder 43, a convolutional interleave circuit 44, a convolutional encoder 45, a bit/symbol interleave circuit 46, a mapping circuit 47, a frame adaptation circuit 48, an IFFT circuit 49, a guard interval adding circuit 50, an orthogonal modulator 51, a D/A converter 52 and a TPS generation circuit 53.

An MPEG-2 transport stream produced by compressing and multiplexing video signals and audio signals are input to the OFDM modulator 23 from the upstream MPEG-2 encoder 22. The transport stream is then fed to the MUX adaptation/energy dispersion circuit 42 of the OFDM modulator 23.

The MUX adaptation/energy dispersion circuit 42 performs an operation of bit inversion on the sync byte 47 h (1 byte) at the head of every eighth TS packet to turn it to B8h. At this time, it initializes the shift register for generating a pseudo-random number series (PRBS) that is used for energy dispersion at every eighth TS packet by means of a predetermined seed. The MUX adaptation/energy inverse dispersion circuit 42 operates for energy dispersion by performing an exclusive OR operation of the data excluding the sync byte (1 byte) of the TS packet and the PRBS.

Figure 9:
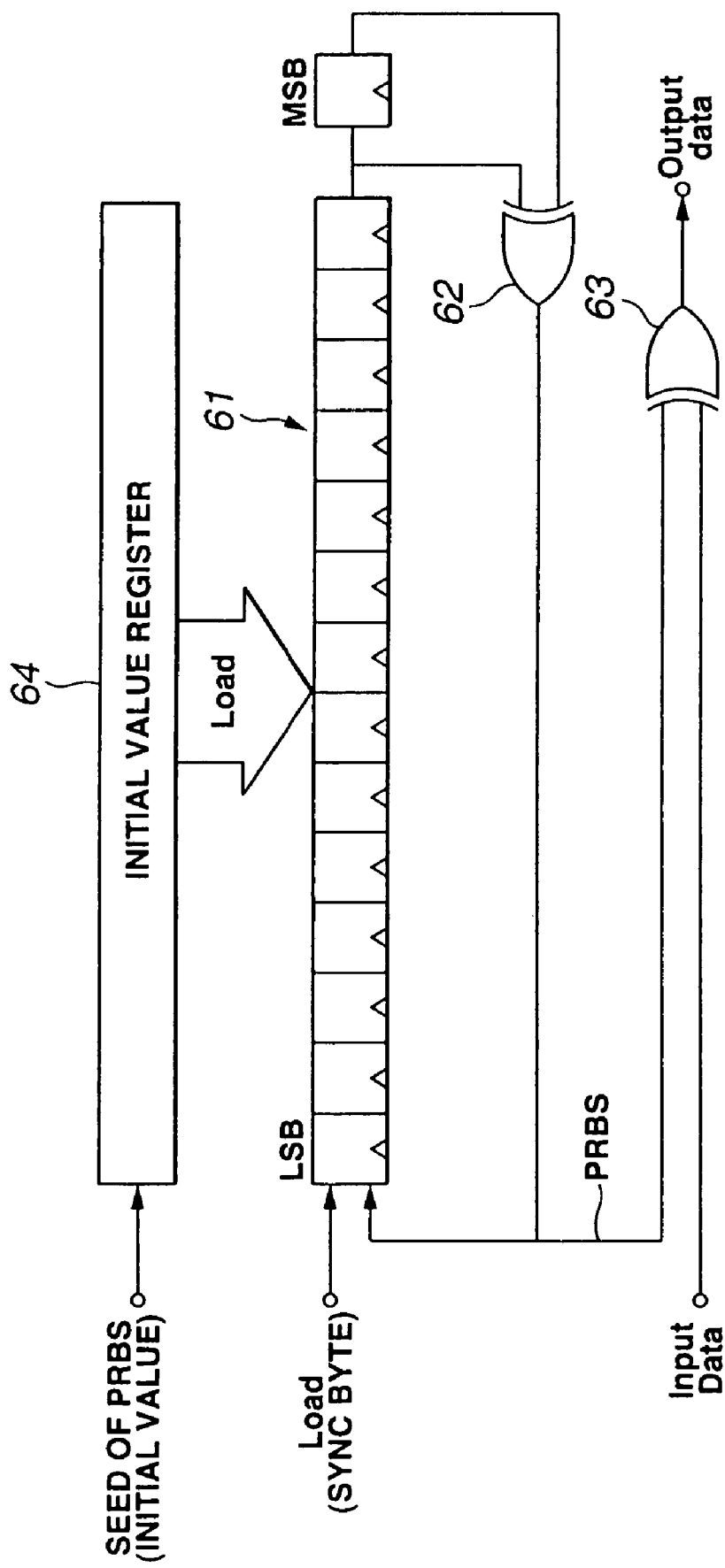
FIG. 9 is a schematic circuit diagram of the energy dispersion circuit of the OFDM modulator of FIG. 8.

The MUX adaptation/energy dispersion circuit 42 performs energy dispersion by means of an energy dispersion processing circuit as shown in FIG. 9. According to the DVB-T Standard, the pseudo-random number series to be used for energy dispersion is expressed by an M series of degree 15 of $(x^{15}+x^{14}+1)$. Although energy dispersion is conducted according to the DVB-T Standard in the above description, it may alternatively be conducted by means of some other series.

As shown in FIG. 9, the energy dispersion circuit comprises a 15-step shift register 61, a first EX-OR circuit 62, a second EX-OR circuit 63 and an initial value register 64.

The 15-step shift register 61 is realized by connecting 15-step registers for storing a 1-bit data in series. A clock corresponding to a bit of input data is entered to the 15-step shift register 61 at a time so that the data is transferred on a bit by bit basis from a lower order bit to a higher order bit. The output of the first EX-OR circuit 62 is fed back and input to the register for the least significant bit (LSB).

Each of the 15-step shift register 61 is provided with a load terminal. As a load flag is asserted at the load terminal, the value currently held in the corresponding register of the 15-step shift register 61 is cleared and the seed (initial value) stored in the initial value register 64 is loaded there. The seed is loaded at the timing of detection of the sync byte (B8h) at the head of the TS packet.

The first EX-OR circuit 62 performs an EX-OR operation of the data of the 14-th bit and that of the 15-th bit of the 15-step shift register and outputs the outcome of the operation. The signal output from the first EX-OR circuit 62 is used as the pseudo-random number series of the M series of degree 15 of $(x^{15}+x^{14}+1)$.

The second EX-OR circuit 63 performs an EX-OR operation of the pseudo-random number series output from the first EX-OR circuit 62 and the input data (transport stream) on a bit by bit basis and outputs the outcome of the operation.

The initial value register 64 stores the seed (initial value: 15 bits) of the pseudo-random number series at the head of each TS packet.

The value to be stored in the initial value register 64 can be selected externally and arbitrarily and modified. In other words, the user can arbitrarily modify the initial value.

However, a same seed (initial value) of pseudo-random number series needs to be selected for both the transmitter (wireless camera 11) and the receiver (signal receiving relay station 12). When the two sides use different seeds, the receiver cannot restore the data dispersed by the transmitter.

Therefore, the third party cannot restore the ultimate raw image and other data as long as the user of the radio relay system 1 selects the seed (initial value) of pseudo-random number series and keeps it as secret.

While the degree of the pseudo-random number series is made to be equal to 15 in the above description, a pseudo-random number series of any other degree may be used for the purpose of the invention.

The data processed for energy dispersion is then fed to the Reed-Solomon encoder 43.

The Reed-Solomon encoder 43 performs a Reed-Solomon coding operation on the input data series and adds a parity of 16 bytes for each TS packet. The data series to which a parity is added is supplied to the convolutional interleave circuit 44.

Figure 3:
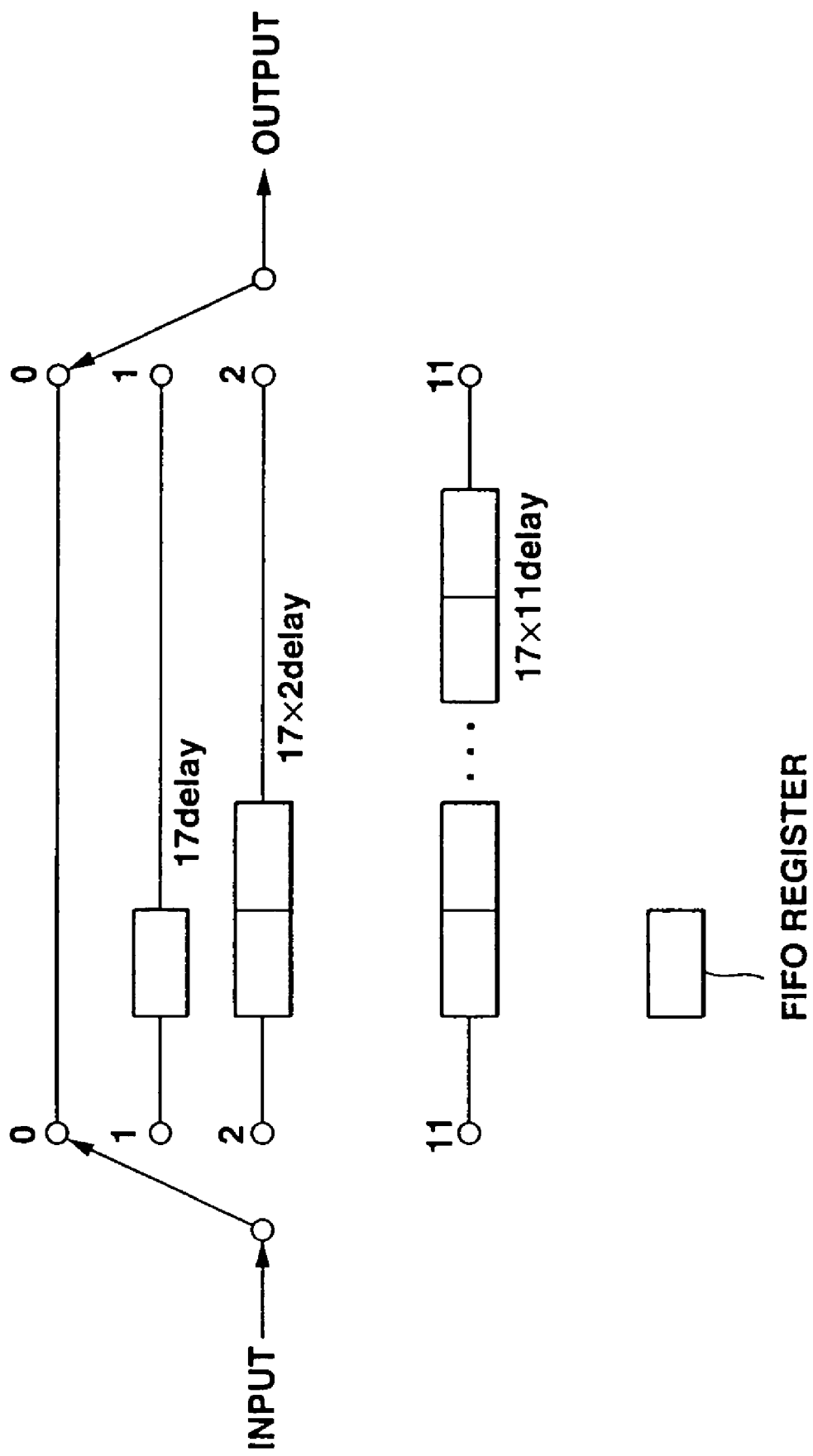
FIG. 3 is a schematic illustration of the configuration of a convolutional interleave circuit.
Figure 4:
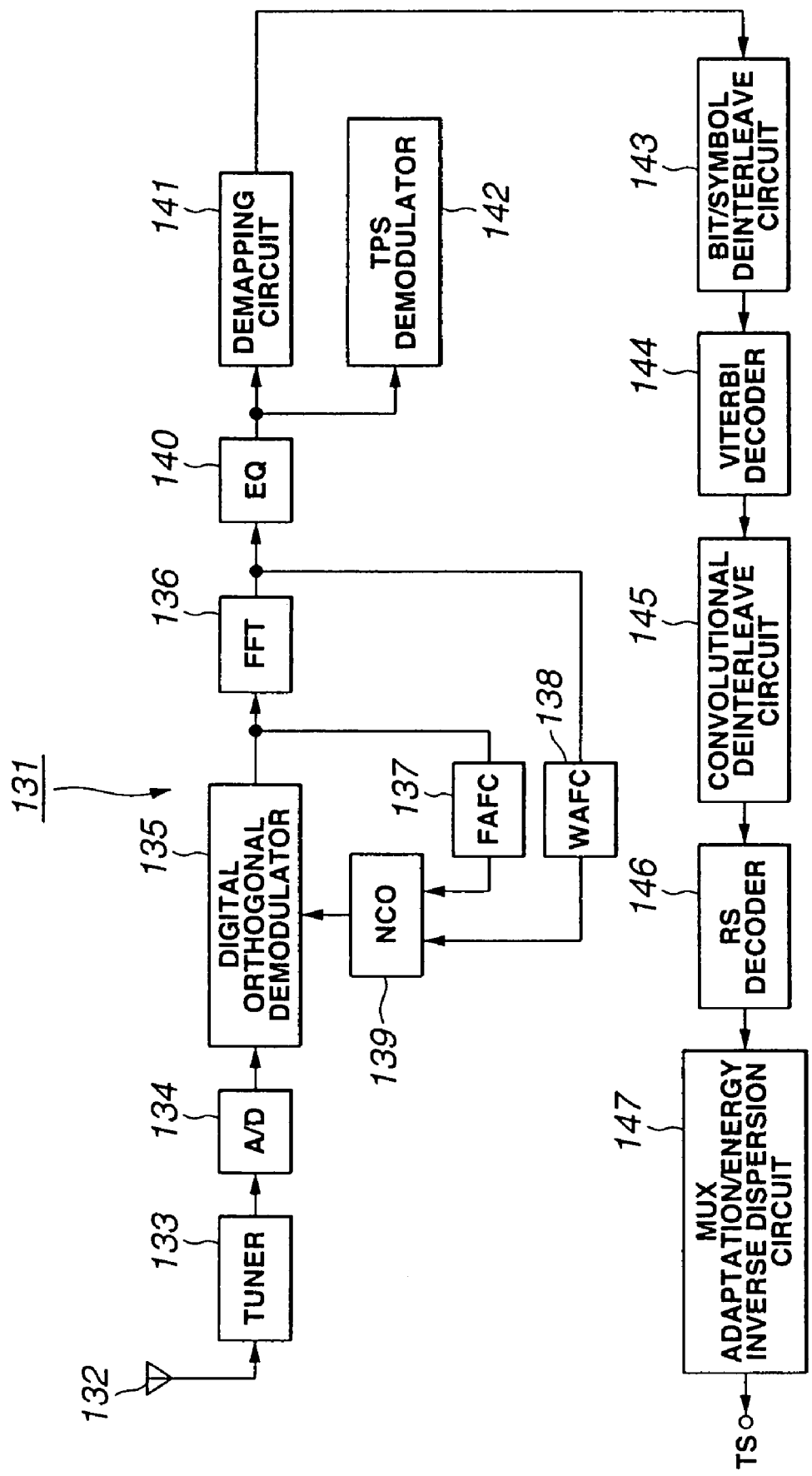
FIG. 4 is a schematic block diagram of a known OFDM demodulator.

The convolutional interleave circuit 44 performs an interleaving operation on. the input data series. For-example, the convolutional interleave circuit 44 has 12 branches that are provided with respective delay elements having respective amounts of delay that are different from each other as shown in FIG. 3. It selects a same branch for both input and output, switching branches for every byte sequentially in a manner such as 0, 1, 2, 3, 4, . . . , 10, 11, 0, 1, 2, . . . . It outputs a byte for an input byte and performs a convolutional interleaving operation. The data series subjected to the convolutional interleaving operation is then fed to the convolutional encoder 45.

The convolutional encoder 45 performs convolutional coding by means of two encoders such as G1=171 (Octal) and G2=133 (Octal) and outputs encoded 2 bits for a 1-bit input. When it performs a puncturing operation, it does so on the output of encoded 2 bits. The data series subjected to convolutional encoding is then fed to the bit/symbol interleave circuit 46.

The bit/symbol interleave circuit 46 interleaves the frequency in the OFDM symbol and the bits allocated to mapping points. The interleaved data series is then supplied to the mapping circuit 47.

The mapping circuit 47 divides the data series by a code length conforming to the employed modulation method (e. g., a code length of 6 bits for 64 QAM) and allocates the divided data series to predetermined mapping points. As a result of allocating the data series to the mapping points, two-dimensional information comprising I and Q components is output. The data series that is turned to two-dimensional information is supplied to the frame adaptation circuit 48.

The frame adaptation circuit 48 performs a so-called OFDM framing operation of inserting a predetermined pilot signal, a transmission line multiplexing control signal (TPS: Transmission Parameter Signaling) and a null signal fed from the TPS generation circuit 53 into the mapped two-dimensional information. The data series subjected to OFDM framing is then fed to the IFFT circuit 49.

The IFFT circuit 49 turns the 2,048 sets of data for I and Q to an OFDM symbol and performs an IFFT operation collectively on it. The data series subjected to an IFFT operation is then supplied to the guard interval adding circuit 50 on an effective symbol by effective symbol basis.

The guard interval adding circuit 50 makes a copy of the signal waveform of the rear ¼ of the signal of each effective signal output from the IFFT circuit 49 and adds the copy to the head of the effective symbol to make it a guard interval. The data series now added with a guard interval is then supplied to the D/A converter 52.

The orthogonal modulator 51 generated of the IF signal performs orthogonal modulation an I signal and Q signal. The IF signal is then supplied to the D/A converter 52.

The D/A converter 52 converts the digital signal into an analog IF signal.

The IF signal generated by the OFDM modulator 23 is then supplied to the downstream frequency converter 24.

Now, the OFDM demodulator 34 in the signal receiving relay station 12 will be described below by referring to FIG. 10.

Figure 10:
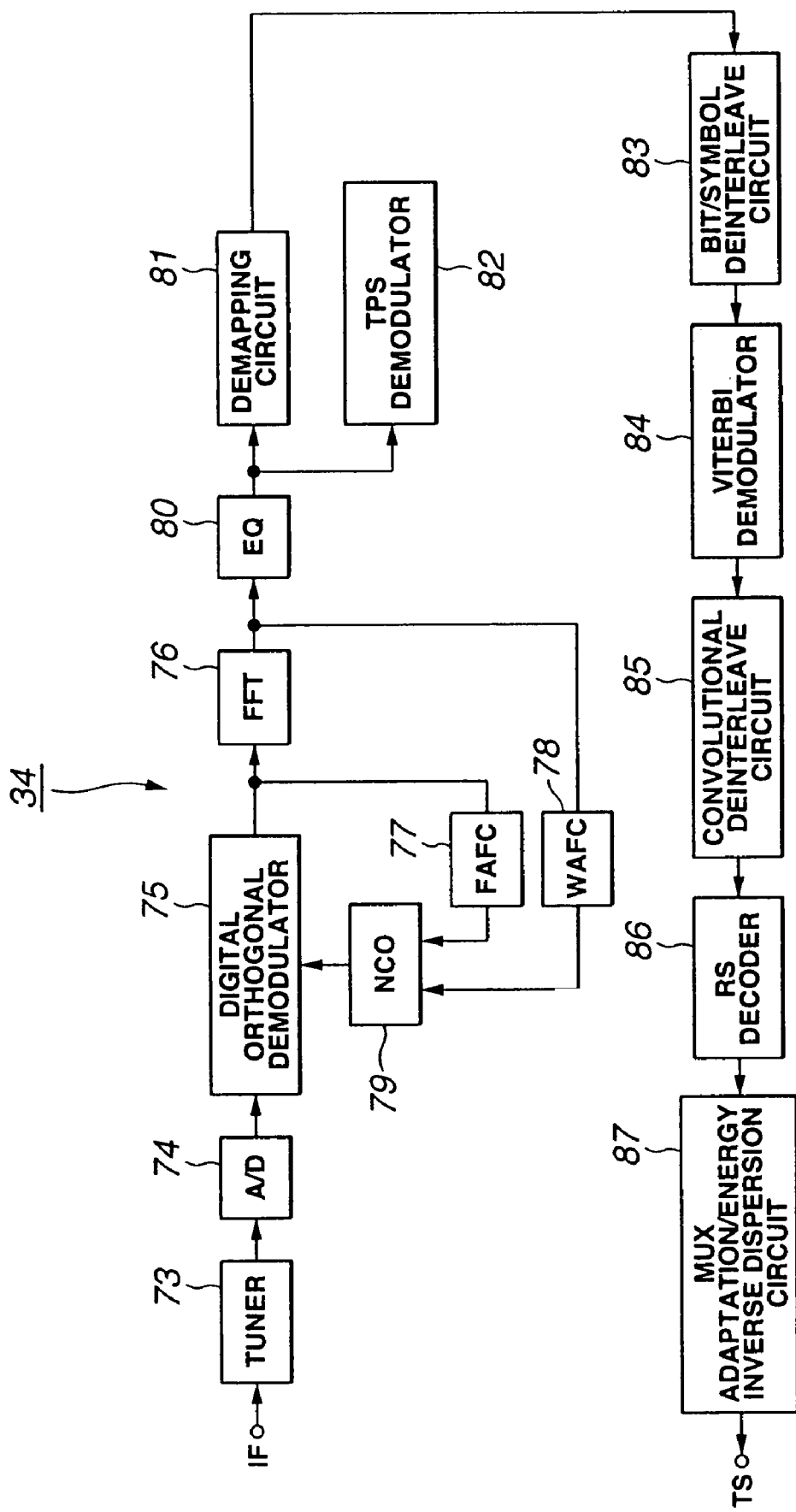
FIG. 10 is a schematic block diagram of the OFDM demodulator of the reception relay station of FIG. 7.

As shown in FIG. 10, the OFDM demodulator 34 comprises an A/D converter 74, a digital orthogonal demodulation circuit 75, an FFT operation circuit 76, a narrow band fc error computation (FAFC) circuit 77, a broad band fc error computation circuit 78, a numerical-controlled oscillation (NOC) circuit 79, an equalizer 80, a demapping circuit 81, a TPS (transmission parameter signaling) demodulation circuit 82, a bit/symbol deinterleave circuit 83, a Viterbi decoding circuit 84, a convolutional deinterleave circuit 85, a Reed-Solomon decoding circuit 86 and a MUX adaptation/energy inverse dispersion circuit 87.

The IF signal subjected to frequency conversion in the upstream frequency converter 33 is input to the OFDM demodulator 34. Then, the IF signal is fed to the A/D converter 74 of the OFDM demodulator 34.

The A/D converter 74 digitizes the IF signal. The digitized IF signal is then supplied to the digital orthogonal demodulation circuit 75. According to the DVB-T. Standard (2K mode), the A/D converter 74 quantizes the effective symbol and the guard interval of a so-called OFDM time region signal with a double clock typically for sampling respectively 4,096 samples and 1,024 samples.

The digital orthogonal demodulation circuit 75 performs orthogonal demodulation on the digitized IF signal, using the carrier signal of a predetermined frequency (carrier frequency) and outputs a base band OFDM signal. The base band OFDM signal output from the digital orthogonal demodulation circuit 75 is a so-called time region signal that is to be subjected to an FFT operation. Therefore, a base band signal that has been subjected to digital orthogonal demodulation and yet is to be subjected to an FFT operation is referred to as OFDM time region signal hereinafter. As a result of orthogonal demodulation, the OFDM time region signal becomes a complex signal containing a real axis component (I channel signal) and an imaginary axis component (Q channel signal).

The OFDM time region signal output from the digital orthogonal demodulation circuit 75 is then supplied to the FFT operation circuit 76 and the narrow band fc error computation circuit 77.

The FFT operation circuit 76 performs an FFT operation on the OFDM time region signal and extracts the orthogonal-modulated data on each subcarrier, which data is then output. The signal output from the FFT operation circuit 76 is a so-called frequency region signal that has been subjected to FFT. Therefore, a signal that has been subjected to an FFT operation is referred to as OFDM frequency region signal hereinafter.

Figure 1:
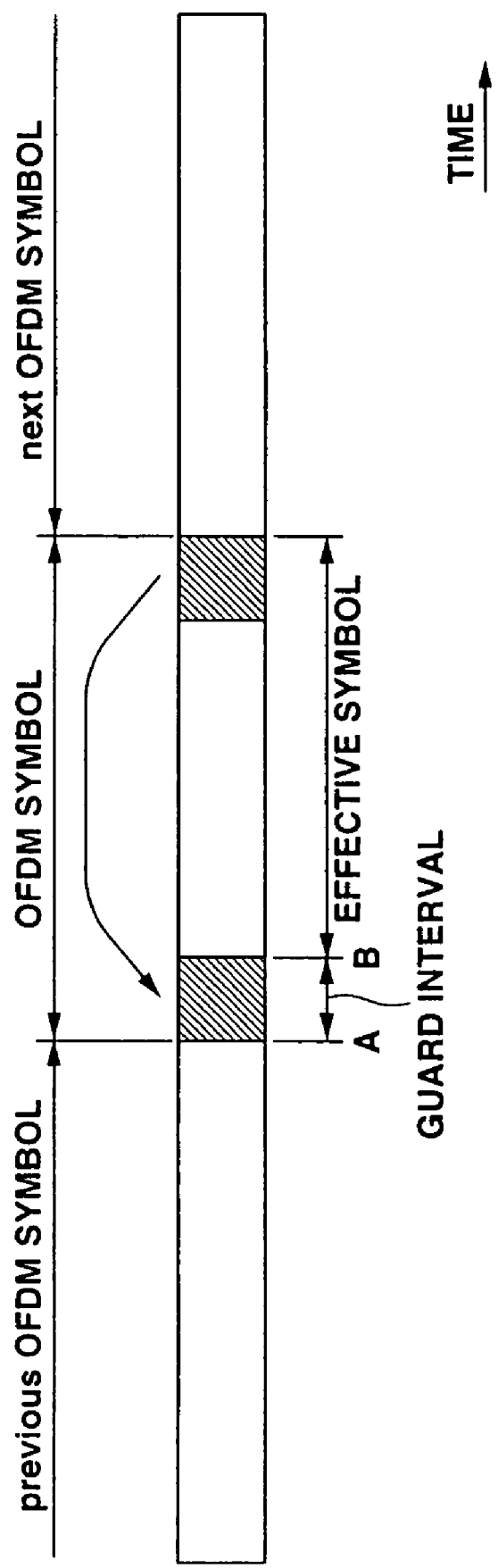
FIG. 1 is a schematic illustration of the signal structure of an OFDM symbol.
Figure 2:
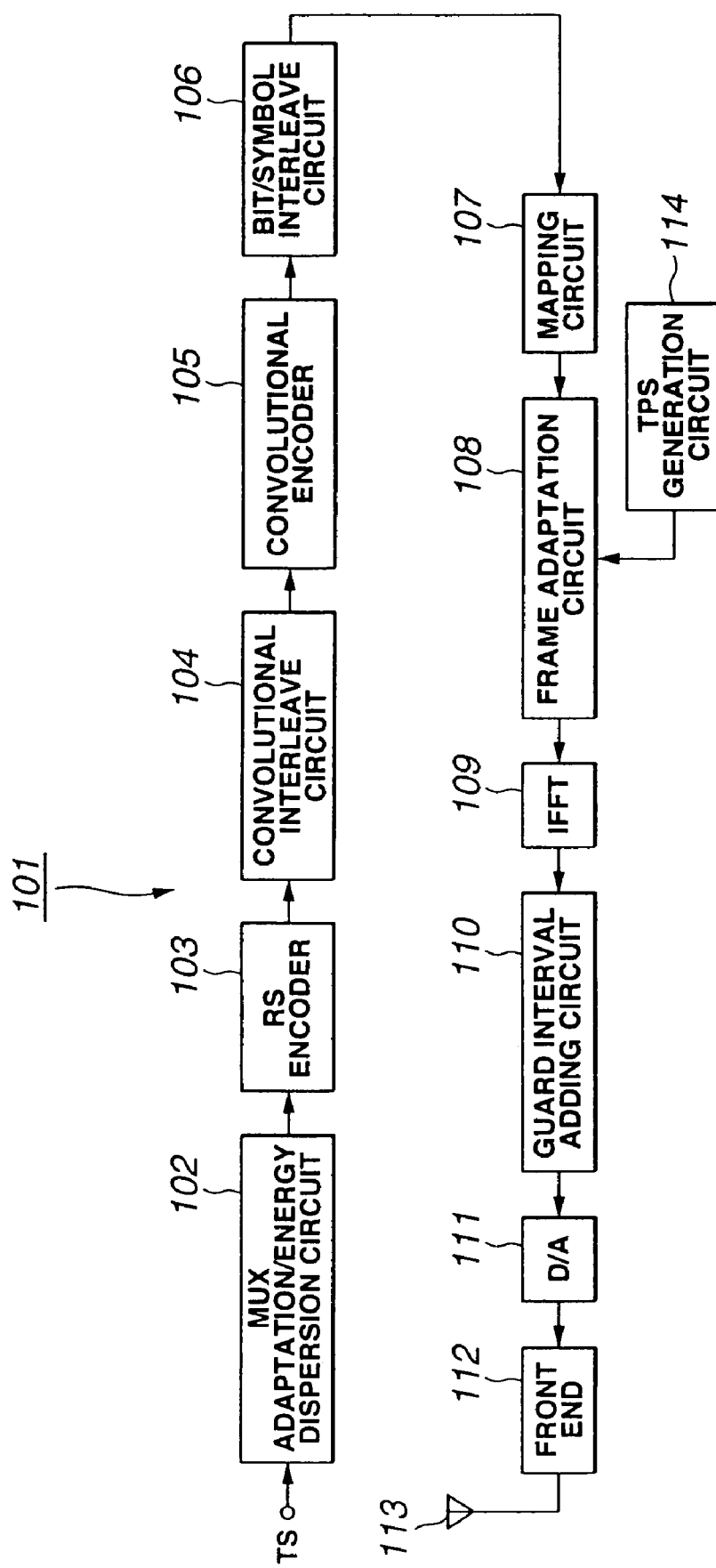
FIG. 2 is a schematic block diagram of a known OFDM modulator.

The FFT operation circuit 76 extracts the signals in an effective symbol length (e. g., 2,048 samples) out of an OFDM symbol. In other words, it extracts signals from the part of an OFDM symbol obtained by excluding the guard interval. Then, it performs an FFT operation on the OFDM time region signal of the extracted 2,048 samples. More specifically, the operation starting position will be found between the boundary of the OFDM symbol (position at A in FIG. 1) and the end position of the guard interval (position at B in FIG. 1). This range of operation is referred to as FFT window.

Like the OFDM time region signal, the OFDM frequency region signal output from the FFT operation circuit 76 is a complex signal containing a real axis component (I channel signal) and an imaginary axis component (Q channel signal). The OFDM frequency region signal is then supplied to the broad band fc error computation circuit 78 and the equalizer 80.

The narrow band fc error computation circuit 77 computes the carrier frequency error contained in the OFDM time region signal. More specifically, the narrow band fc error computation circuit 77 computes the narrow band carrier frequency error with an accuracy of ±½ of the subcarrier frequency interval (4.14 kHz) or less. The carrier frequency error is the error of the central frequency position of the OFDM time region signal that can be produced typically by displacement of the reference frequency output from the local oscillator of the tuner 73. The error rate of the output data increases when this error becomes large. The narrow band carrier frequency error determined by the narrow band fc error computation circuit 77 is then fed to the NCO 79.

The broad band fc error computation circuit 78 computes the carrier frequency error contained in the OFDM time region signal. More specifically, the broad band fc error computation circuit 78 computes the broad band carrier frequency error with an accuracy of the subcarrier frequency interval (4.14 kHz) or less. The broad band fc error computation circuit 78 refers to a continual pilot signal (CP signal) and computationally determines the extent, or the amount of shift, by which the CP signal is shifted from the proper insertion position of the CP signal. The broad band carrier frequency error determined by the broad band fc error computation circuit 78 is supplied to the NCO 79.

The NCO 79 adds the narrow band carrier frequency error of the accuracy of ±½ of the subcarrier frequency interval as determined by the narrow band fc error computation circuit 77 and the broad band carrier frequency error of the accuracy of the subcarrier frequency interval as determined by the broad band fc error computation circuit 78 and outputs a carrier frequency error correction signal whose frequency increases/decreases as a function of the carrier frequency error obtained as a result of the addition. The carrier frequency error correction signal is a complex signal and supplied to the digital orthogonal demodulation circuit 75. The carrier frequency error correction signal performs digital orthogonal demodulation, correcting the carrier frequency fc according to it signal.

The equalizer 80 equalizes the phase and the amplitude of the OFDM frequency region signal, using a scattered pilot signal (SP signal). The OFDM frequency region signal whose phase and amplitude are equalized is then supplied to the demapping circuit 81 and the TPS demodulation circuit 82.

The TPS demodulation circuit 82 separates the TPS signal assigned to a predetermined frequency component and demodulates the information containing the coding ratio, the modulation method, the guard interval length and so on from the signal.

The demapping circuit 81 performs a demapping operation on the OFDM frequency region signal whose phase and amplitude have been equalized by the equalizer 80 according to the modulation method to decode the data. The demapped data is then fed to the bit/symbol deinterleave circuit 83.

The bit/symbol deinterleave circuit 83 performs an operation exactly opposite to that of bit-interleaving and symbol-interleaving conducted by the OFDM modulator. The data that is subjected to bit-deinterleaving and symbol-deinterleaving is then supplied to the Viterbi decoding circuit 84.

The Viterbi decoding circuit 84 performs a maximum likelihood decoding operation, using the Viterbi algorithm. The data subjected to maximum likelihood decoding is then supplied to the convolutional deinterleave circuit 85.

The convolutional deinterleave circuit 85 operates oppositely relative to the convolutional interleave circuit of the OFDM modulator. The data subjected to convolutional deinterleaving is then fed to the Reed-Solomon decoding circuit 86.

The Reed-Solomon decoding circuit 86 decodes the Reed-Solomon code according to the parity of the 16 bytes added by the OFDM modulator and corrects errors, if any. The data subjected to Reed-Solomon decoding is then fed to the MUX adaptation/energy inverse dispersion circuit 87.

If the sync byte of the TS packet that is the leading byte is 47 h, the MUX adaptation/energy inverse dispersion circuit 87 does nothing on it. However, if the sync byte is B8h, it inverts the bits and modifies the byte to 47 h. At this time, the MUX adaptation/energy inverse dispersion circuit 87 initializes the shift register for generating a pseudo-random number series (PRBS) that is used for energy dispersion at every TS packet whose sync byte is B8h by means of a predetermined seed. The MUX adaptation/energy inverse dispersion circuit 87 operates for energy inverse dispersion by performing an exclusive OR operation of the data excluding the sync byte (1 byte) of the TS packet and the PRBS.

The MUX adaptation/energy inverse dispersion circuit 87 has a circuit configuration same as the energy dispersion circuit of the wireless camera 11.

Thus, with the inverse dispersion circuit, the seed (initial value) to be given to the 15-bit shift register is also externally and arbitrarily selected and hence modifiable. Then, a same value is selected for the seed (initial value) of pseudo-random number series for both the transmitter side (wireless camera 11) and the receiver side (signal receiving relay station 12) so that the raw images and other data transmitted from the wireless camera 11 can be restored at the signal receiving relay station 12.

The data series subjected to energy inverse dispersion is then fed to the broadcasting station as transport stream.

Thus, with the above described embodiment of radio relay system 1, the seed (initial value) of the energy dispersion/inverse dispersion circuit that is also commonly used in known OFDM modulator/demodulator can be selected and modified arbitrarily. Therefore, it is possible for the radio relay system 1 to enhance the confidentiality of raw images and sounds and auxiliary data and prevent them from leaking to the third party with a simple arrangement. In other words, only the staff of the radio relay system can use the raw images and sounds.

While the present invention is described above in terms of a radio relay system of a broadcasting station, the present invention is by no means limited thereto. For example, the present invention is also applicable to any systems that require an enhanced level of security, be they home use or professional use such as those used in broadcasting stations. Additionally, the transmitter side is not limited to a camera and may alternatively be any facility adapted to transmit data by a wireless transmission path.

While a same seed (initial value) of pseudo-random number series is selected externally by the user in the above description of the embodiment, it may alternatively be so arranged that the transmitter side transmits a signal containing the initial value and the receiver side automatically retrieve and use the initial value. For instance, it may be so arranged that the TPS added at the time of OFDM framing contains the initial value. Still alternatively, it may be so arranged that the seed (initial value) is selected by some means at either the transmitter side or the receiver side and transmitted to the other side by some information transmitting means (e. g., telephone).

INDUSTRIAL APPLICABILITY

With an OFDM modulator, an OFDM demodulator and an OFDM transmission/reception system according to the invention, the initial value of pseudo-random number series to be used for energy dispersion can be selected and modified externally. Therefore, it is possible to enhance the confidentiality of the raw images and sounds and auxiliary data transmitted wirelessly and prevent them from leaking to the third party with a simple arrangement.

The invention claimed is:

1. An OFDM demodulator for demodulating an orthogonal frequency division multiplexed (OFDM) digital data series, the OFDM demodulator comprising:

an energy inverse dispersion means for performing energy inverse dispersion for the demodulated digital data series by means of a pseudo-random number series, the energy inverse dispersion means comprising a shift register and an exclusive disjunction logic gate;

an initial value selecting means for varying an initial value of the pseudo-random number series according to an external input, wherein the initial value is supplied to the energy inverse dispersion means; and a restoring means for restoring the initial value of the pseudo-random number series transmitted to the restoring means;

wherein the initial value selecting means is adapted to select the initial value of the pseudo-random number series on the basis of the initial value restored in the restoring means.

* * * * *